July 29, 1969     A. N. D'ELIA ET AL     3,458,200
CHANCE GAME DEVICE HAVING AN INDICIA BEARING BASE INDEXED
BY ROTATABLE MEMBERS HAVING INDICATORS THEREON
Filed Sept. 22, 1966

INVENTORS
ANTHONY N. D'ELIA
EDWARD M. STOLARZ
BY
ATTORNEYS

United States Patent Office 3,458,200
Patented July 29, 1969

3,458,200
CHANCE GAME DEVICE HAVING AN INDICIA BEARING BASE INDEXED BY ROTATABLE MEMBERS HAVING INDICATORS THEREON
Anthony N. D'Elia, 3555 Netherland Ave., Riverdale, N.Y. 10471, and Edward M. Stolarz, 30 W. 60th St., New York, N.Y. 10023
Filed Sept. 22, 1966, Ser. No. 581,372
Int. Cl. A63b *71/00;* A63f *1/00*
U.S. Cl. 273—138         4 Claims

ABSTRACT OF THE DISCLOSURE

A rotating pointer chance game device having a base having a central opening therein and divided into a plurality of separate sectors having indicia thereon and a plurality of annularly and radially spaced colored patterns. A plurality of rotatable members, each with a central bore therethrough, have an indicator thereon and a plurality of spaced apertures therethrough. A disc is rotatably removably seated in the opening in the base over which the members, one at a time, are disposed with their central bore aligned on the rotatable disc. The apertures on the disposed member are arranged for coincidence with the patterns on the base so as to align the indicator with a predetermined sector. The apertures on different members are arranged so that coincidence of the apertures on the patterns for different members results in the associated pointers being aligned with different indicia sectors.

---

This invention relates to a game especially adapted to be used in conjunction with promotion of sales in food markets, gasoline stations, drug stores and in various establishments, while being equally adaptable for use as a game for home use or by participants at a public gathering.

Various types of games are being used to promote sales of merchandise in various establishments. These games provide unusual interest to the customer, and increase the sales or interest in the establishment employing these games. Heretofore the games generally consisted of affixing indicators or stamps to cards or the matching of halves of checks or other cards. None of these games employed any visual action.

The primary object of the present invention is to provide a highly attractive game adapted to employ the simplest of material in its product yet which is extremely colorful and which employs a proportionate amount of suspense during the actuation thereof by the participant, thereby enhancing the interest.

The game features a card on which is provided means dividing it into a plurality of separate sectors having indicia thereon indicative of a prize. There is further provided a plurality of annularly and radially spaced colored patterns on the base. A paperboard disc is adapted to be rotatably mounted on the card utilizing a nickel or other suitable coin as a pivot. The disc is provided with a plurality of apertures therein which are annularly spaced at radially different lengths from the center of the disc. An indicator is provided on the disc so that upon rotation of the disc to align with predetermined of the colored patterns, the disc will point to a special sector denoting a particular prize or the like.

Still further objects and features of the present invention reside in the provision of a game which can be printed utilizing various decorative colors and configurations, which is easy to render substantially cheat proof, which provides considerable attraction to people of both sexes and any age, yet which is extremely inexpensive to produce thereby permitting wide use and distribution.

These, together with the various ancillary objects and features of the invention which will become apparent as the following description proceeds are attained by this game, a preferred embodiment of which has been illustrated in the accompanying drawing, by way of example only, wherein:

FIG. 1 is a plan view of the base which may be in the form of a card or the like in accordance with the concept of the present invention;

FIG. 2 is a plan view of a rotatable member which may be in the form of a paperboard disc;

FIG. 3 is an exploded diametrical sectional detail view of the game; and,

FIG. 4 is a plan view of the assembled game.

With continuing reference to the accompanying drawings, wherein like reference numerals designate similar parts throughout the various views, reference numeral 10 is used to generally designate an embodiment of the game constructed in accordance with the concepts of the present invention. The game is formed of three main parts, a base 12, a rotatable member 14 and a coin 16.

The base 12 is preferably formed of a relatively thin cardboard or paperboard material and has a central opening 18 therein of such size that when a disc in the form of a nickel or other like coin 16 is disposed therein, it will fit snugly. Means are provided which divided the base 12 into a plurality of sectors such as indicated at 20, 22, 24, 26, etc. Provided on the base 12 are a plurality of colored patterns 28, 30, 32, 34, 36, 38. These patterns are annularly spaced from each other and may be spaced radially at different distances from the center of the circular shaped base 12. Any suitable number of these colored patterns may be provided. Printed in these sectors are various numbers, words, and figures, which may be indicative of the prizes to be awarded.

The rotatable member or disc 14 is formed of relatively thin paperboard or cardboard and has serrated or weakened portions defining as at 40 a central portion 42 which can be broken away so as to form a bore for rotatably receiving the disc 16, thereby permitting the mounting of the rotatable member 14 with respect to the base 12 for rotation thereof. Likewise rouletted, perforated or weakened portions may be provided at 44, 46, 48, 50, 52 and 54, which may be of the same number as the number of colored patterns on the base 12 or may preferably be of a lesser number. These weakened portions 44 through 54 permit the punching out of the material thereof as shown in FIG. 2 so that the colored patterns can be seen through the apertures formed by punching out the material.

In use, the rotatable member 14 as provided with the weakened portions not broken away is utilized by first pushing out the center circular portion and the weakened portion to form the bore and apertures. Then, a coin corresponding to the size of the central opening 18 is placed in the opening provided and the rotatable member 14 is then placed on the nickel so as to be rotatable. Holding the nickel on a flat surface the rotating member 14 is rotated until all of the apertures 44 through 54 are aligned with predetermined of the colored patterns due to the relative eccentricity thereof. There is only one predetermined location where the apertures 44 through 54 will align with the colored patterns so that the colored patterns show through the apertures 44 through 54, and, as can be seen in FIG. 4, complete the pattern or color provided at 58 on the rotatable member 14, the pattern of 58 preferably being the same color as the colored patterns 28 through 38. In other positions, as shown in dotted lines at B, FIG. 1, the apertures 44 through 54 will not align with the colored patterns. At the predetermined location where the apertures 44 through 54 are in alignment with the colored patterns as seen in FIG. 4, the arrow will point to a specific sector such as section 20. When the arrow points to a number, this may be considered as being a cash prize in the form of actual or play money. The holder then wins that prize indicated. When the indicator 60 points to a letter, such as the letter U, Sector 20, this letter may be then checked on the base 12 and the player goes onto select another rotatable member 14 until the player spells out a word, such as "Fortune," which is rated a particular prize.

If the indicator 60 points to one of the sectors wherein a product or other prize is described by words, then the described prize is that which is won by the player. Of course, the game can be played in a manner so that each player receives a number of rotatable members and the sectors can be marked with such indicia or prizes as to make for an interesting and informative game.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

We claim:

1. A game of chance comprising a base having a central opening therein, means dividing said base into a plurality of separate sectors having indicia thereon, a plurality of annularly and radially spaced colored patterns on said base, a disc rotatably removably seated in said opening in said base, a plurality of rotatable members each having a central bore therethrough, an indicator thereon, and a plurality of spaced apertures therethrough, said members being rotatably disposable one at a time on said disc with said apertures on said so disposed member being arranged for coincidence with said patterns to align said indicator with a predetermined one of said sectors, the plurality of apertures on different members being so arranged that upon coincidence of said apertures with said patterns, the associated pointers will be aligned with different indicia sectors.

2. A game according to claim 1, wherein said disc is a coin, said base and said rotatable members being considerably thinner than said coin.

3. A game according to claim 1, wherein said apertures are spaced at different radial distances from said central bore.

4. A game according to claim 1, wherein said disc is a coin, said base being a paperboard card, said rotatable members being paperboard discs, said coin being of considerably greater thickness than said base and said members.

References Cited
UNITED STATES PATENTS

| | | | |
|---|---|---|---|
| 1,709,849 | 4/1929 | Hazel | 35—74 X |
| 1,902,672 | 3/1933 | Sperber | 35—74 X |
| 3,011,270 | 12/1961 | Hosbach | 35—31.1 |
| 3,289,324 | 12/1966 | Benson | 35—31.1 |

ANTON O. OECHSLE, Primary Examiner

ARNOLD W. KRAMER, Assistant Examiner

U.S. Cl. X.R.

35—74; 273—141